United States Patent
Yao et al.

(10) Patent No.: US 11,917,433 B2
(45) Date of Patent: Feb. 27, 2024

(54) MRO FOR 5G NETWORKS

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 17/219,506

(22) Filed: Mar. 31, 2021

(65) Prior Publication Data

US 2021/0219157 A1 Jul. 15, 2021

Related U.S. Application Data

(60) Provisional application No. 63/007,574, filed on Apr. 9, 2020.

(51) Int. Cl.
*H04W 24/08* (2009.01)

(52) U.S. Cl.
CPC .................................. *H04W 24/08* (2013.01)

(58) Field of Classification Search
CPC ......... H04W 24/08; H04L 12/28; H04L 12/50
USPC ......................................... 370/400, 403, 329
See application file for complete search history.

(56) References Cited

U.S. PATENT DOCUMENTS

2022/0352936 A1* 11/2022 Baldemair .............. H04L 27/20

* cited by examiner

*Primary Examiner* — Dang T Ton
(74) *Attorney, Agent, or Firm* — Schwegman Lundberg & Woessner, P.A.

(57) ABSTRACT

A method and system for generating performance measurements related to DL and UL packet delays through a NG-RAN are described. The NG-RAN receives GTP PDU monitoring packets from a UPF and, in response measures the DL delays of the packets to and UL delays from a UE. The NG-RAN determines the per 5QI and per S-NSSAI distribution of the DL and UL delays and sends the performance measurements to a service provider. The average DL and UL delays may also be provided to the service provider. The service provider is in the NG-RAN or a separate management system. For a network slice, service providers for different NG-RANs send the performance measurements to a network slice service provider, where the individual NG-RAN performance measurements are combined to provide both the average and distribution of the DL and UL delays in the network slice.

20 Claims, 8 Drawing Sheets

MRO FOR 5G NETWORKS

PRIORITY CLAIM

This application claims the benefit of priority to U.S. Provisional Patent Application Ser. No. 63/007,574, filed, Apr. 9, 2020, which is incorporated herein by reference in its entirety.

TECHNICAL FIELD

Embodiments pertain to wireless communications in 5G, or new radio (NR), systems. Some embodiments related to Mobility Robustness Optimization (MRO) in 5G networks.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/$5^{th}$ generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
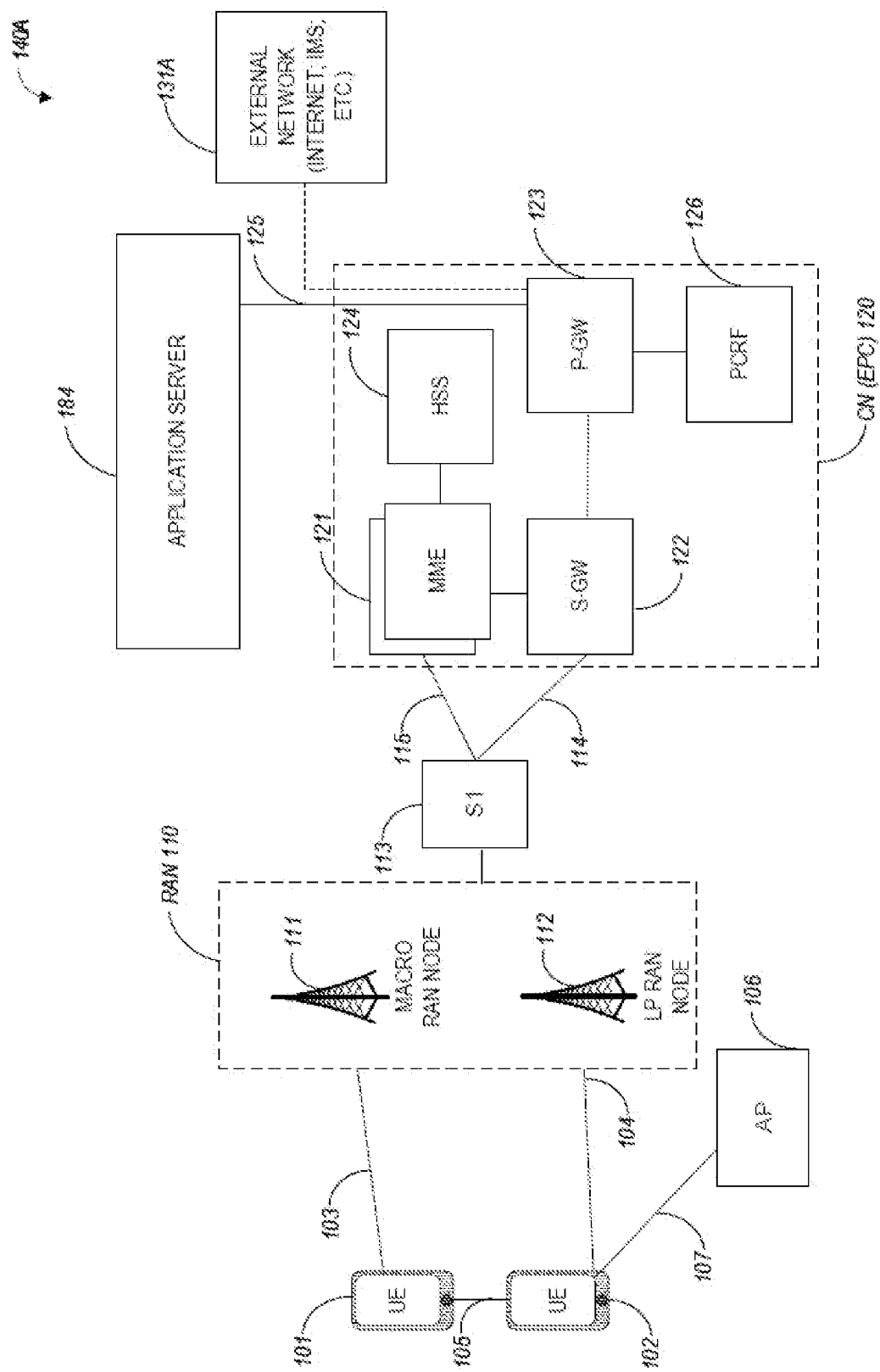
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as /base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
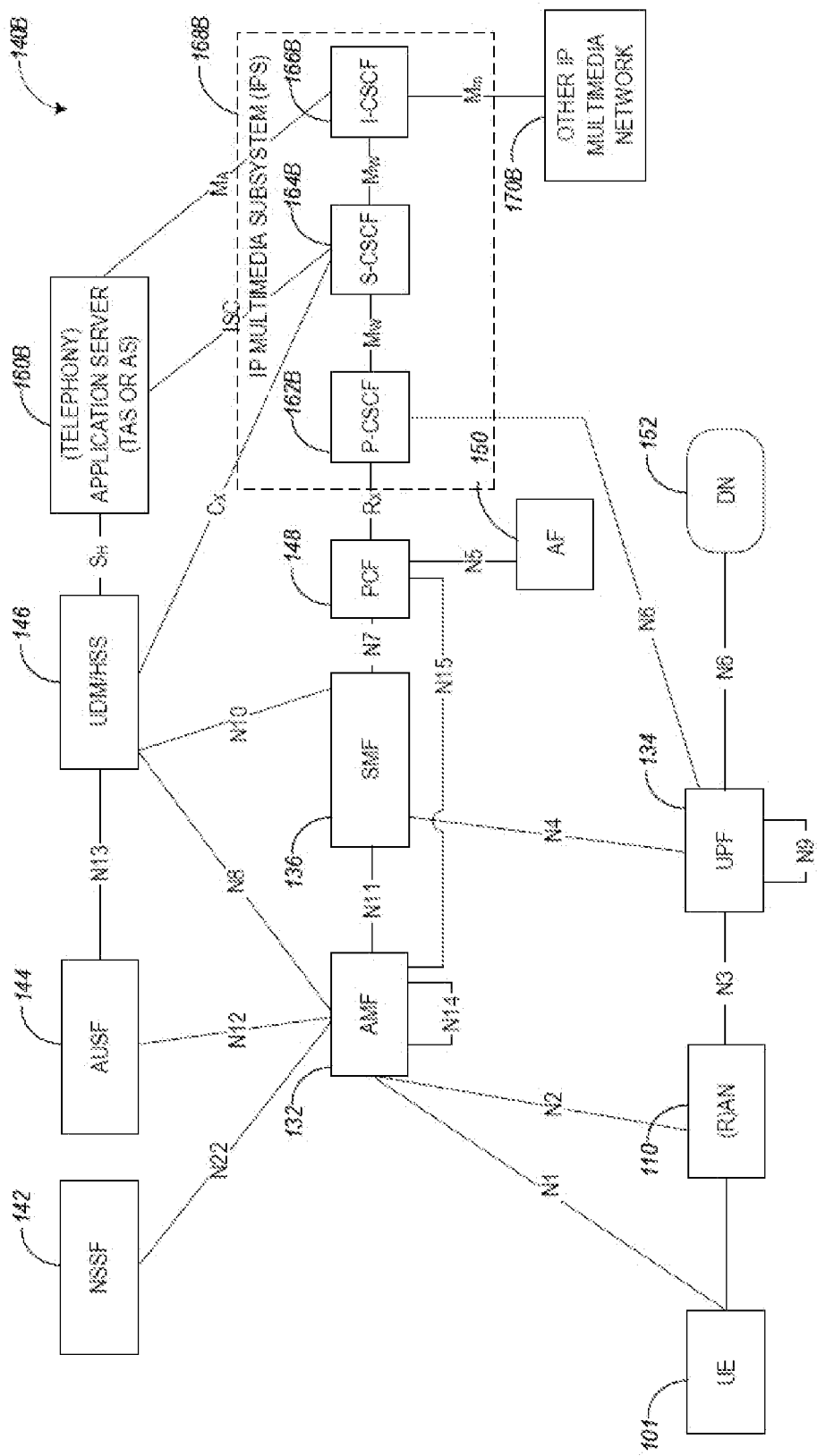
FIG. 1B illustrates a non-roaming 5G system architecture in accordance with some aspects.

FIG. 1B illustrates a non-roaming 5G system architecture in accordance with some aspects. In particular. FIG. 1B illustrates a 5G system architecture 140B in a reference point representation. More specifically. UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown). N8 (between the UDM 146 and the AMF 132, not shown). N9 (between two UPFs 134, not shown). N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
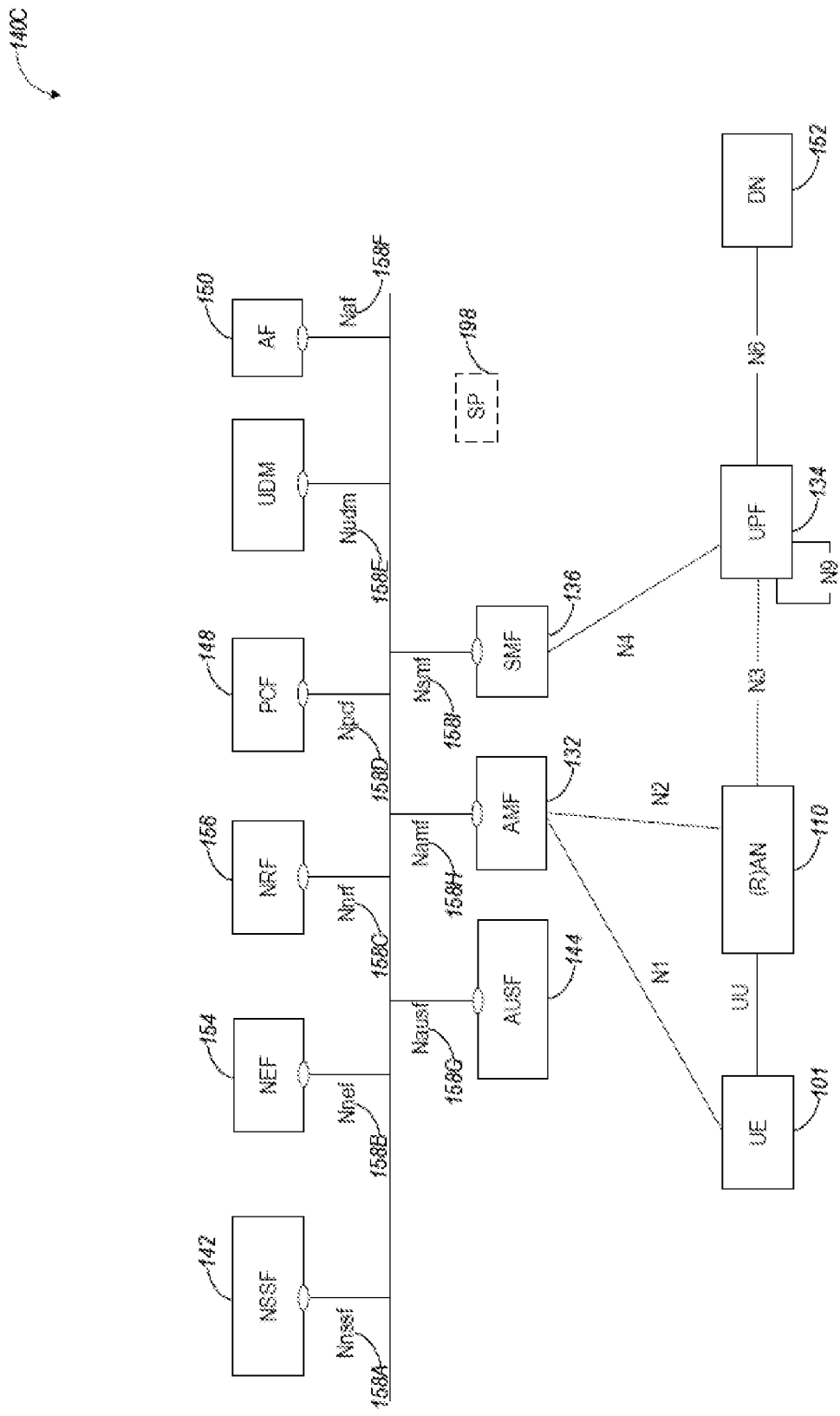
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
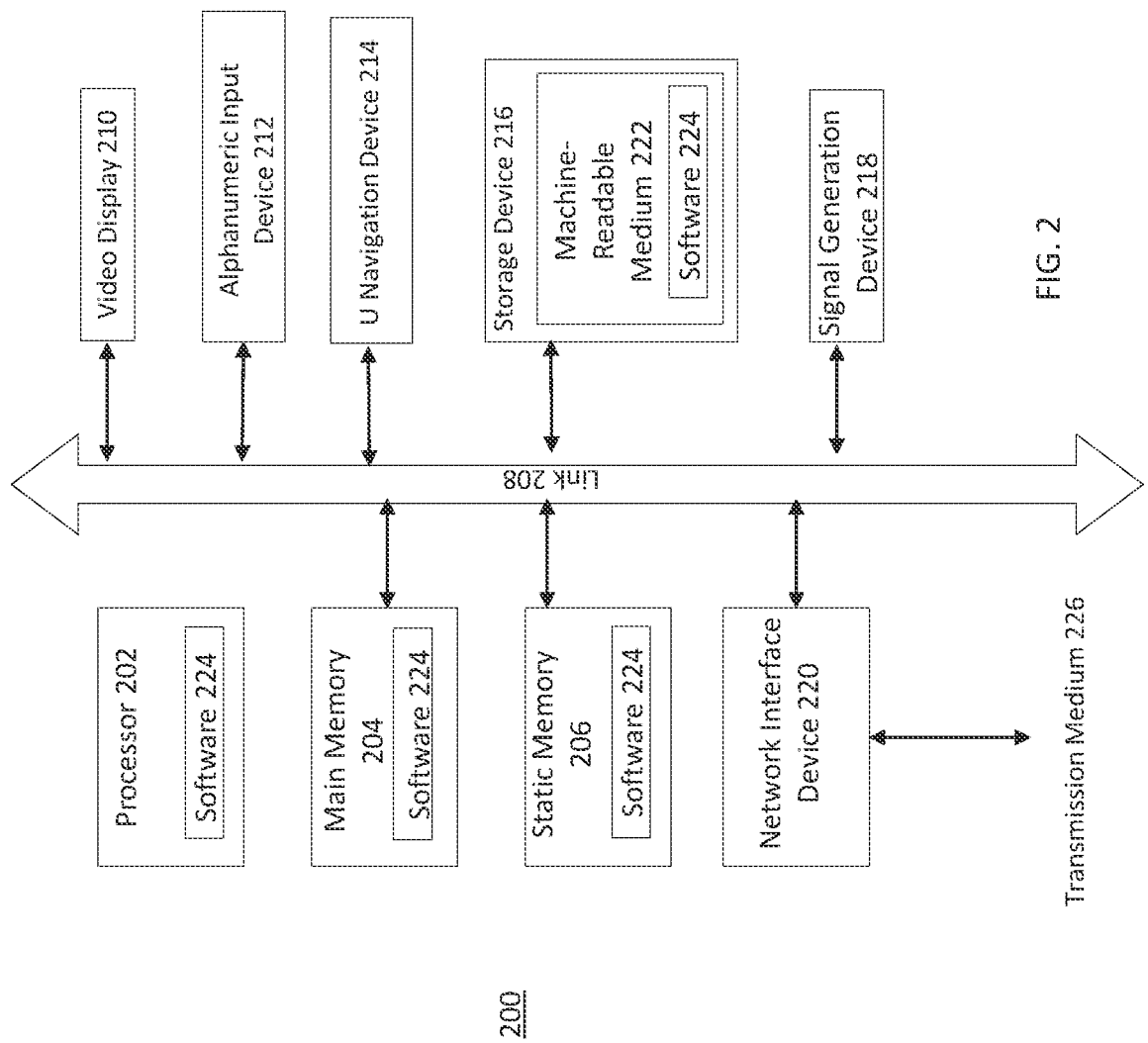
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3:
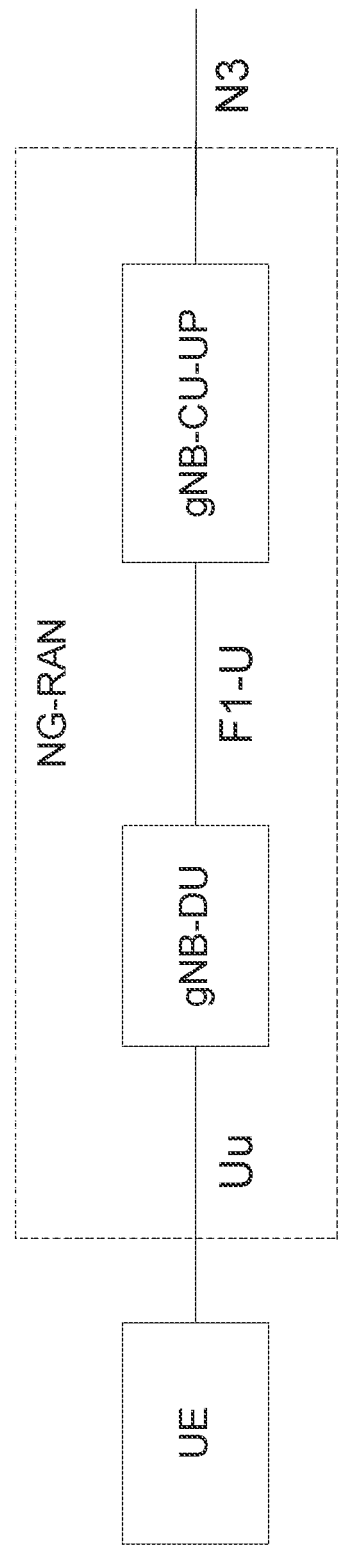
FIG. 3 illustrates user plane packet delay in accordance with some embodiments.

As above, one of the issues in a 5G network is the packet delay. The DL/UL packet delay between the NG-RAN and the UE (including the delay at the gNB-CU-UP, on the F1-U interface and on the gNB-DU and the delay over the Uu interface) is one significant part of the e2e delay that has impact to users' experience for some types of services (e.g., Ultra-reliable low-latency communication (URLLC)). Generation of performance measurements based on performance measurements of the individual NG-RANs may permit adjustment of network resources to enhance user experience by, e.g., reducing latency (the measured delay) and/or packet loss, improving connectivity, providing gNB (or other network device) load balancing, etc. . . . . . In some embodiments, the service provider may indicate or perform the adjustment. In other embodiments, the adjustment may be performed by other network devices. FIG. 3 illustrates user plane packet delay in accordance with some embodiments.

The measurements on DL/UL packet delay between the NG-RAN and the UE are missing. The measurements on DL packet delay in the NG-RAN for a Network Slice are missing. Accordingly, it would beneficial to generate the performance measurements related to user plane packet delay based on time stamps in the GPRS Tunneling Protocol (GTP) packets and/or NG-RAN measurement results.

Figure 4:
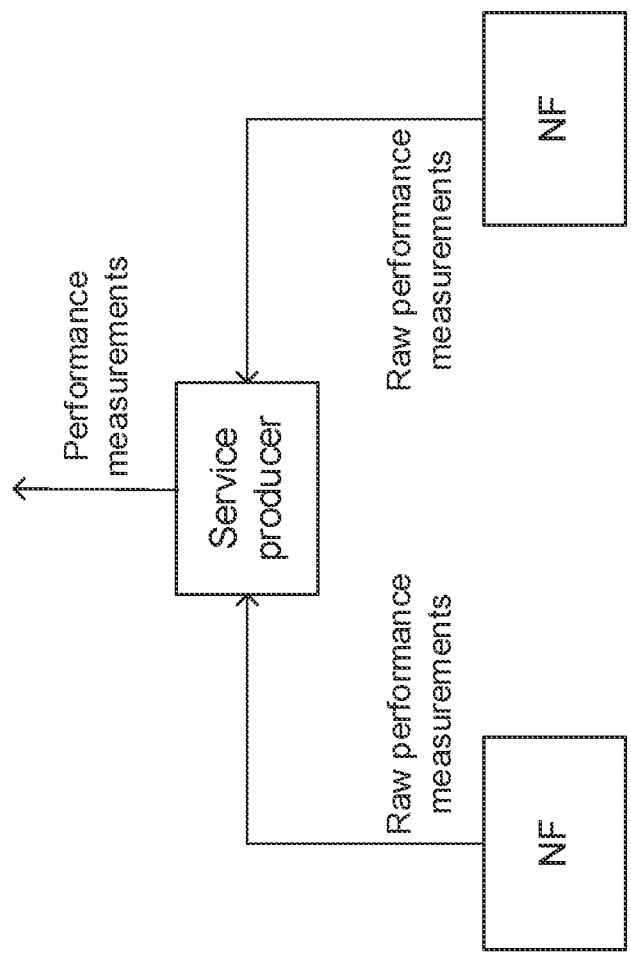
FIG. 4 illustrates network slice performance measurement generation in accordance with some embodiments.
Figure 5B:
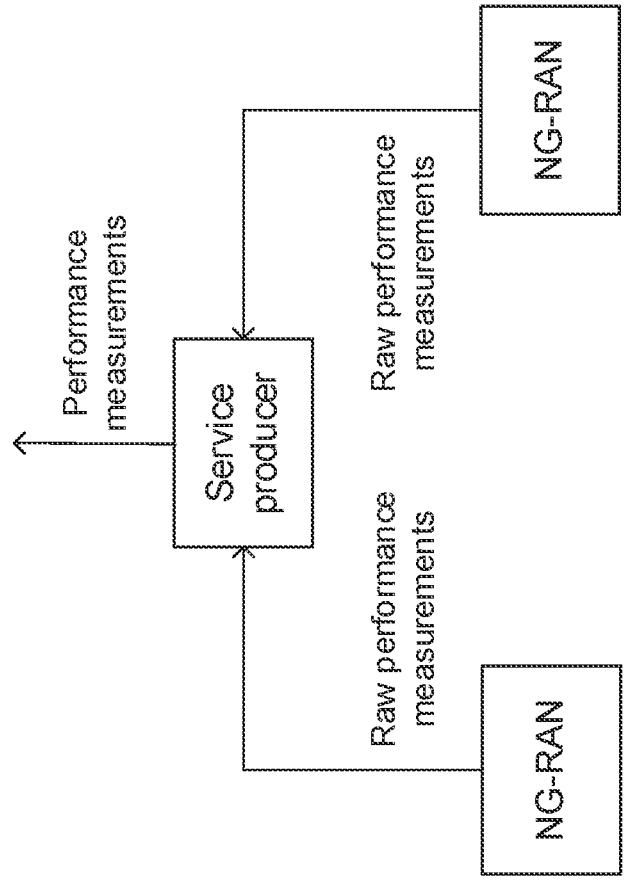
FIG. 5B illustrates network slice performance measurement generation in accordance with some embodiments.
Figure 5A:
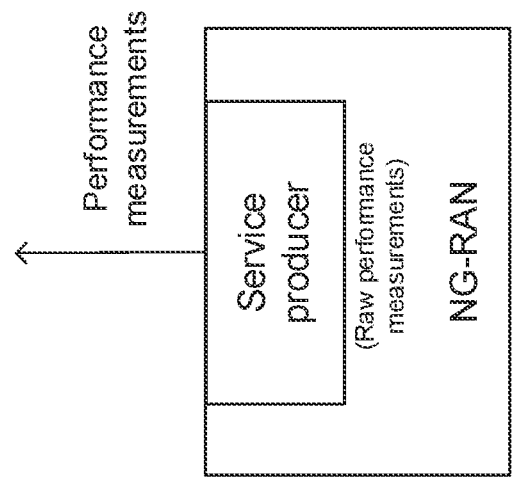
FIG. 5A illustrates network slice performance measurement generation in accordance with some embodiments.
Figure 6:
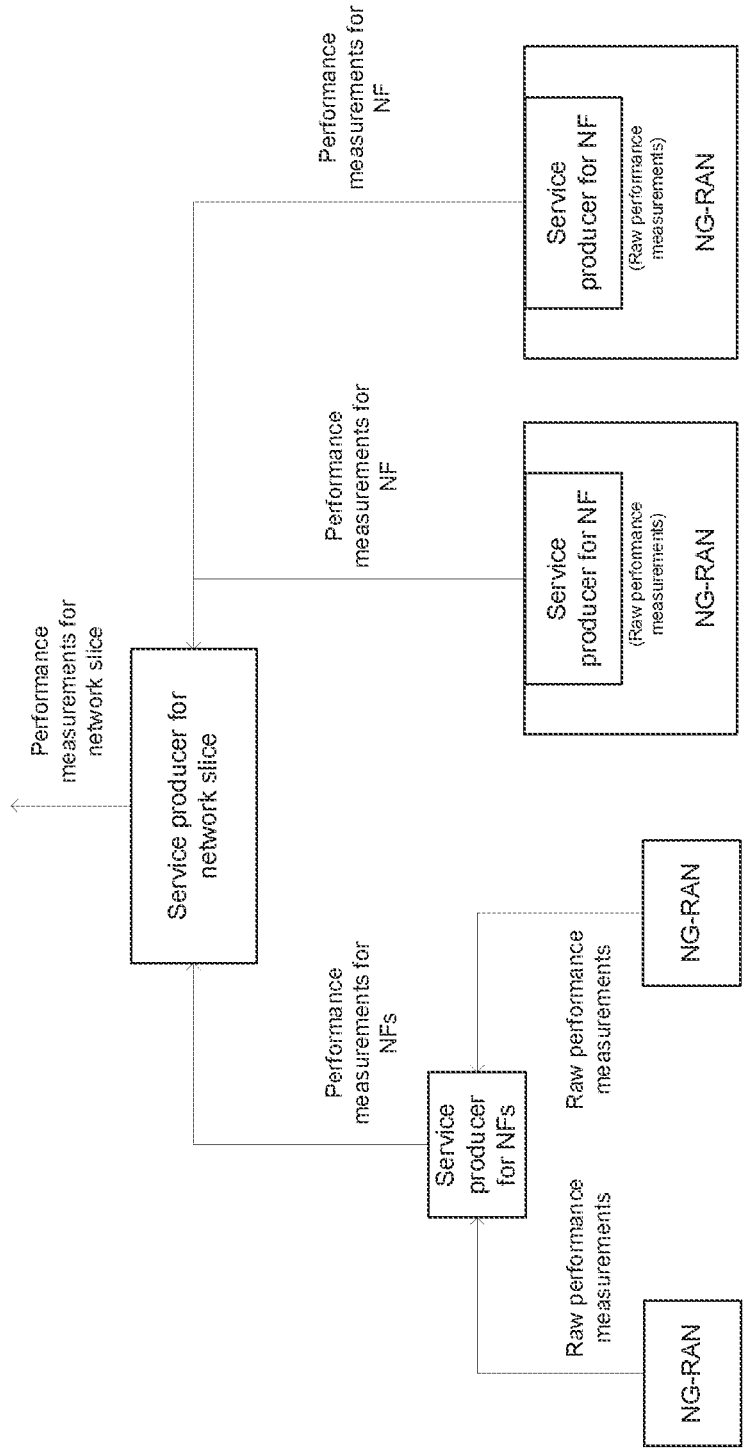
FIG. 6 illustrates network slice performance measurement generation in accordance with some embodiments.

FIG. 4 illustrates user plane packet delay in accordance with some embodiments. As shown, a service producer collects the raw performance measurements from NFs, and then generates the performance measurements for NFs for its consumers. Specifically, the NF may be a gNB (gNB-CU-UP), and the service producer may be implemented within the NF or in a separate management system. Other implementations of network slice performance measurement generation are shown in the next several FIGS. FIG. 5A illustrates network slice performance measurement generation in accordance with some embodiments. FIG. 5B illustrates network slice performance measurement generation in accordance with some embodiments. FIG. 6 illustrates network slice performance measurement generation in accordance with some embodiments.

5.1.1.1.p Average DL Delay Between NG-RAN and UE
a) This measurement provides the average DL packet delay between the NG-RAN and the UE, which is the average of the summed delay incurred in the NG-RAN (including the delay at the gNB-CU-UP, on the F1-U interface and on the gNB-DU) and the delay over the Uu interface. This measurement is split into sub-counters per 5G Quality of Service (QoS) Identifier (5QI) and subcounters per Single Network Slice Selection Assistance Information (S-NSSAI).
b) DER (n=1).
c) The measurement is obtained by the following method:
The gNB performs the GTP packet data unit (PDU) packet delay measurement for QoS monitoring per the GTP PDU monitoring packets received from UPF, and records the following time stamps and information included in the GTP-U header of each GTP PDU monitoring response packet (packet i) sent to the UPF (see TS 23.501 and 38.415):
The DL Delay Result from the NG-RAN to the UE indicating the downlink delay measurement result, which is the sum of the delay incurred in the NG-RAN (including the delay at the gNB-CU-UP, on the F1-U interface and on the gNB-DU) and the delay over the Uu interface (see TS 38.415, and the DL Delay Result is denoted by DRdl);
The 5QI and S-NSSAI associated to the GTP PDU monitoring response packet.
The gNB counts the number (N) of GTP PDU monitoring response packets for each 5QI and each S-NSSAI respectively, and takes the following calculation for each 5QI and each S-NSSAI:

$$\frac{\sum_{i=1}^{N}(DRdl_i)}{N} \qquad \text{Equation (1)}$$

d) Each measurement is a real number representing the average delay in microseconds.

e) DRB.DelayDlNgranUeAve.5QI, where 5QI identifies the 5QI;
DRB.DelayDlNgranUeAve.SNSSAI, where SNSSAI identifies the S-NSSAI.
f) NRCellCU.
g) Valid for packet switched traffic.
h) 5GS.

5.1.1.1.q Distribution of DL Delay Between the NG-RAN and UE a) This measurement provides the distribution of DL packet delay between the NG-RAN and the UE, which is the delay incurred in the NG-RAN (including the delay at the gNB-CU-UP, on the F1-U interface and on the gNB-DU) and the delay over U the u interface. This measurement is split into subcounters per 5QI and subcounters per S-NSSAI.
b) DER (n=1).
c) The measurement is obtained by the following method:
The gNB performs the GTP PDU packet delay measurement for QoS monitoring per the GTP PDU monitoring packets received from the UPF, and records the following time stamps and information included in the GTP-U header of each GTP PDU monitoring response packet (packet i) sent to the UPF (see TS 23.501 and 38.415):
The DL Delay Result from the NG-RAN to the UE indicating the downlink delay measurement result which is the sum of the delay incurred in the NG-RAN (including the delay at the gNB-CU-UP, on the F1-U interface and on the gNB-DU) and the delay over the Uu interface (see 38.415, and the DL Delay Result is denoted by DRdl);
The 5QI and S-NSSAI associated to the GTP PDU monitoring response packet.
The gNB increments the corresponding bin with the delay range where the DRdl falls into by 1 for the subcounters per 5QI and subcounters per S-NSSAI.
d) Each measurement is an integer representing the number of GTP PDUs measured with the delay within the range of the bin.
e) DRB.DelayDlNgranUeDist.5QI.Bin, where Bin indicates a delay range which is vendor specific, and 5QI identifies the 5QI; DRB.DelayDlNgranUeDist.SNSSAI.Bin, where Bin indicates a delay range which is vendor specific, and SNSSAI identifies the S-NSSAI.
f) NRCellCU.
g) Valid for packet switched traffic.
h) 5GS.

5.1.1.1.x Average UL Delay Between the NG-RAN and the UE a) This measurement provides the average UL packet delay between the NG-RAN and the UE, which is the average of the summed delay incurred in the NG-RAN (including the delay at the gNB-CU-UP, on the F1-U interface and on the gNB-DU) and the delay over the Uu interface. This measurement is split into subcounters per 5QI and subcounters per S-NSSAI.
b) DER (n=1).
c) The measurement is obtained by the following method:
The gNB performs the GTP PDU packet delay measurement for QoS monitoring per the GTP PDU monitoring packets received from the UPF, and records the following time stamps and information included in the GTP-U header of each GTP PDU monitoring response packet (packet i) sent to the UPF (see TS 23.501 and 38.415):
The UL Delay Result from the UE to NG-RAN indicating the uplink delay measurement result which is the sum of the delay incurred in the NG-RAN (including the delay at the gNB-CU-UP, on the F1-U interface and on the gNB-DU) and the delay over the Uu interface (see TS 38.415, and the UL Delay Result is denoted by DRul);
The 5QI and S-NSSAI associated to the GTP PDU monitoring response packet.
The gNB counts the number (N) of GTP PDU monitoring response packets for each 5QI and each S-NSSAI respectively, and takes the following calculation for each 5QI and each S-NSSAI:

$$\frac{\sum_{i=1}^{N}(DRul_i)}{N} \quad \text{Equation (2)}$$

d) Each measurement is a real representing the average delay in microseconds.
e) DRB.DelayUlNgranUeAve.5QI, where 5QI identifies the 5QI;
DRB.DelayUlNgranUeAve.SNSSAI, where SNSSAI identifies the S-NSSAI.
f) NRCellCU.
g) Valid for packet switched traffic.
h) 5GS.

5.1.1.1.y Distribution of UL Delay Between the NG-RAN and the UE a) This measurement provides the distribution of UL packet delay between the NG-RAN and the UE, which is the delay incurred in the NG-RAN (including the delay at the gNB-CU-UP, on the F1-U interface and on the gNB-DU) and the delay over the Uu interface. This measurement is split into subcounters per 5QI and subcounters per S-NSSAI.
b) DER (n=1).
c) The measurement is obtained by the following method:
The gNB performs the GTP PDU packet delay measurement for QoS monitoring per the GTP PDU monitoring packets received from the UPF, and records the following time stamps and information included in the GTP-U header of each GTP PDU monitoring response packet (packet i) sent to the UPF (see TS 23.501 and 38.415):
The UL Delay Result from the UE to the NG-RAN indicating the uplink delay measurement result which is the sum of the delay incurred in the NG-RAN (including the delay at the gNB-CU-UP, on the F1-U interface and on the gNB-DU) and the delay over Uu interface (see 38.415, and the UL Delay Result is denoted by DRul).
The 5QI and S-NSSAI associated to the GTP PDU monitoring response packet.
The gNB increments the corresponding bin with the delay range where the DRulfalls into by 1 for the subcounters per 5QI and subcounters per S-NSSAI.
d) Each measurement is an integer representing the number of GTP PDUs measured with the delay within the range of the bin.
e) DRB.DelayUlNgranUeDist.5QI.Bin, where Bin indicates a delay range which is vendor specific, and 5QI identifies the 5QI; DRB.DelayUlNgranUeDist.SNSSAI.Bin, where Bin indicates a delay range which is vendor specific, and SNSSAI identifies the S-NSSAI.

f) NRCellCU.
g) Valid for packet switched traffic.
h) 5GS.
6.x.1 Delay in NG-RAN for Network Slice
6.x.1.1 Average DL Delay in NG-RAN for Network Slice
  a) This measurement provides the average DL packet delay between NG-RAN and UE for a Network Slice, including the delay at the gNB-CU-UP, on the F1-U interface and on the gNB-DU and the delay over the Uu interface.
  b) CC.
  c) The MnS producer collects the following measurements of all the NR Cell CUs supporting the measured Network Slice identified by the S-NSSAI:
    DRB.DelayDlNgranUeAve.SNSSAI, which is the average DL delay between the NG-RAN and the UE;
    QosFlow.PdcpSduVolumeDl_Filter (where the filter contains the S-NSSAI), which is the DL Cell PDCP SDU Data Volume for split gNBs or non-split gNBs.
  The MnS producer calculates the measurements above-mentioned collected in the granularity period:

$$\frac{\sum_{NR\ Cell\ CU}(DRB \cdot DelayDlNgranUeAve \cdot SNSSAI * QosFlow \cdot PdcpSduVolumeDl\_Filter(S-NSSAI))}{\sum_{NR\ Cell\ Cu} QosFlow \cdot PdcpSduVolumeDl\_Filter(S-NSSAI)}$$

Equation (3)

d) Each measurement is a real number representing the average delay in microseconds.
  e) DRB.DelayDlSliceNgranUeAve.
  f) NetworkSlice.
  g) Valid for packet switched traffic.
  h) 5GS.
6.x.1.2 Distribution of DL Delay in NG-RAN for Network Slice
  a) This measurement provides the distribution of DL packet delay between the NG-RAN and the UE for a Network Slice, including the delay at the gNB-CU-UP, on the F1-U interface and on the gNB-DU and the delay over the Uu interface.
  b) CC.
  c) The MnS producer collects the following measurements of all the NR Cell CUs supporting the measured Network Slice identified by the S-NSSAI:
    DRB.DelayDlNgranUeDist.SNSSAI.Bin, which is the distribution of DL delay between the NG-RAN and the UE.
  The MnS producer calculates the measurements above-mentioned collected in the granularity period for each bin indicating delay range:

$$\frac{\sum_{NR\ Cell\ CU} DRB \cdot DelayDlNgranUeDist \cdot SNSSAI \cdot Bin}{\sum_{NR\ Cell\ Cu} \sum_{Bin}(DRB \cdot DelayDlNgranUeDist \cdot SNSSAI \cdot Bin)} * 100\%$$

Equation (4)

d) Each measurement is a real number representing the percentage GTP PDUs measured with delay within the range of the bin.
  e) DRB.DelayDlSliceNgranUeAve.Bin, where Bin indicates a delay range which is vendor specific.
  f) NetworkSlice.
  g) Valid for packet switched traffic.
  h) 5GS.

6.x.1.y Average UL Delay in the NG-RAN for Network Slice
  a) This measurement provides the average UL packet delay between NG-RAN and UE for a Network Slice, including the delay at the gNB-CU-UP, on the F1-U interface and on the gNB-DU and the delay over the Uu interface.
  b) CC.
  c) The MnS producer collects the following measurements of all the NR Cell CUs supporting the measured Network Slice identified by the S-NSSAI:
    DRB.DelayUlNgranUeAve.SNSSAI, which is the average UL delay between the NG-RAN and the UE;
    QosFlow.PdcpSduVolumeUl_Filter (where the filter contains S-NSSAI), which is the UL Cell PDCP SDU Data Volume for split gNBs or non-split gNBs.
  The MnS producer calculates the measurements above-mentioned collected in the granularity period:

$$\frac{\sum_{NR\ Cell\ CU}(DRB \cdot DelayDlNgranUeAve \cdot SNSSA * QosFlow \cdot PdcpSduVolumeUl\_Filter(S-NSSAI))}{\sum_{NR\ Cell\ Cu} QosFlow \cdot PdcpSduVolumeUl\_Filter(S-NSSAI)}$$

Equation (5)

d) Each measurement is a real number representing the average delay in microseconds.
  e) DRB.DelayUlSliceNgranUeAve.
  f) NetworkSlice.
  g) Valid for packet switched traffic.
  h) 5GS.
6.x.1.z Distribution of UL Delay in the NG-RAN for a Network Slice
  a) This measurement provides the distribution of UL packet delay between the NG-RAN and the UE for a Network Slice, including the delay at the gNB-CU-UP, on the F1-U interface and on the gNB-DU and the delay over the Uu interface.
  b) CC.
  c) The MnS producer collects the following measurements of all the NR Cell CUs supporting the measured Network Slice identified by the S-NSSAI:
    DRB.DelayUlNgranUeDist.SNSSAI.Bin, which is the distribution of UL delay between the NG-RAN and the UE.
  The MnS producer calculates the measurements above-mentioned collected in the granularity period for each bin indicating delay range:

$$\frac{\sum_{NR\ Cell\ CU} DRB \cdot DelayUlNgranUeDist \cdot SNSSAI \cdot Bin}{\sum_{NR\ Cell\ Cu} \sum_{Bin}(DRB \cdot DelayUlNgranUeDist \cdot SNSSAI \cdot Bin)} * 100\%$$

Equation (6)

d) Each measurement is a real representing the percentage GTP PDUs measured with delay within the range of the bin.
  e) DRB.DelayUlSliceNgranUeAve.Bin, where Bin indicates a delay range which is vendor specific.
  f) NetworkSlice.
  g) Valid for packet switched traffic.
  h) 5GS.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured for a service producer in a new radio (NR) network, the apparatus comprising:
    processing circuitry to configure the apparatus:
        collect performance measurements of a next generation radio access network (NG-RAN), the performance measurements comprising a downlink (DL) delay distribution between the NG-RAN and a user equipment (UE) and an uplink (UL) delay distribution between the NG-RAN and the UE, each of the DL and UL delay distribution comprising a NG-RAN delay of the NG-RAN and a delay over a Uu interface, the NG-RAN delay including a delay at a $5^{th}$ generation NodeB (gNB) centralized unit user plane (gNB-CU-UP), a delay on an F1-U interface, and a delay on a gNB distributed unit (gNB-DU); and
        send, to a management services consumer, the performance measurements to generate analytics based on the performance measurements, adjustment of network resources to improve the performance measurements being dependent on the analytics; and
    a memory configured to store the performance measurements.

2. The apparatus of claim 1, wherein the processing circuitry further configures the apparatus to collect the performance measurements, which are based on a time stamp of each of a plurality of General Packet Radio Service (GPRS) Tunneling Protocol (GTP) packet measurements unit (PDU) monitoring packets received by the NG-RAN from a user plane function (UPF) and information included in a GTP user plane (GTP-U) header of a GTP PDU monitoring response packet sent by the NG-RAN to the UPF in response to the GTP PDU monitoring packet received from the UPF.

3. The apparatus of claim 2, wherein the information includes a sum of the NG-RAN delay and the delay over the Uu interface and 5G Quality of Service (QoS) Identifier (5QI) and Single Network Slice Selection Assistance Information (S-NSSAI) associated to the GTP PDU monitoring packets.

4. The apparatus of claim 3, wherein the processing circuitry further configures the apparatus to collect the performance measurements that includes a plurality of bins, each bin corresponding with a different DL or UL delay range having a number of GTP PDUs measured with a DL or UL delay.

5. The apparatus of claim 4, wherein the processing circuitry further configures the apparatus to collect the performance measurements having a number of measurements dependent on at least one of a number of QoS levels or a number of supported S-NSSAIs.

6. The apparatus of claim 1, wherein the processing circuitry further configures the apparatus to collect the performance measurements, which are indicated per 5G Quality of Service (QoS) Identifier (5QI) and per supported Single Network Slice Selection Assistance Information (S-NSSAI).

7. The apparatus of claim 1, wherein the processing circuitry further configures the apparatus to collect the performance measurements from a plurality of network function (NF) service producers implemented in at least one NG-RAN associated with the NF service producers and in at least one management system separate from the at least one NG-RAN.

8. The apparatus of claim 1, wherein the processing circuitry further configures the apparatus to collect performance measurements that includes an average of downlink (DL) and uplink (UL) delays between the NG-RAN and the UE, each of the DL and UL delay comprising a NG-RAN delay in the NG-RAN and the delay over the Uu interface.

9. The apparatus of claim 1, wherein:
the processing circuitry further configures the apparatus to collect performance measurements of a plurality of NG-RANs from a plurality of service producers in a network slice,
each service producer is implemented in a NG-RAN associated with the service producer or in a management system for the NG-RAN associated with the service producer that is separate from the NG-RAN associated with the service producer, and
the performance measurements are network slice performance measurements.

10. The apparatus of claim 9, wherein the performance measurements of one of the NG-RANs further comprise an average of DL and UL delays between the one of the NG-RANs and the UE for the network slice, each of the DL and UL delay comprising the NG-RAN delay in the one of the NG-RANs and the delay over the Uu interface.

11. An apparatus of a next generation radio access network (NG-RAN), the apparatus comprising:
processing circuitry to configure the apparatus to:
receive, from a user plane function (UPF) of a new radio (NR) network, General Packet Radio Service (GPRS) Tunneling Protocol (GTP) packet measurements unit (PDU) monitoring packets for quality of service (QoS) monitoring;
measure a delay of the GTP PDU monitoring packets between the NG-RAN and a user equipment (UE) connected to the NG-RAN, the delay comprising a NG-RAN delay of the NG-RAN and a delay over a Uu interface, the NG-RAN delay including a delay at a $5^{th}$ generation NodeB (gNB) centralized unit user plane (gNB-CU-UP), a delay on an F1-U interface, and a delay on a gNB distributed unit (gNB-DU);
for each of the GTP PDU monitoring packets, increment one of a plurality of bins based on the delay of the GTP PDU monitoring packet between the NG-RAN and the UE, the plurality of bins having different delay ranges;
send, in response to reception of each of the GTP PDU monitoring packets, a GTP PDU monitoring response packet; and
send, to a service producer, performance measurements based on the plurality of bins, adjustment of network resources to improve the performance measurements being dependent on the performance measurements sent to the service producer; and
a memory configured to store the performance measurements.

12. The apparatus of claim 11, wherein the processing circuitry further configures the apparatus to record, for each of the GTP PDU monitoring packets, a time stamp of the GTP PDU monitoring packet and information included in a GTP user plane (GTP-U) header of the GTP PDU monitoring response packet sent to the UPF in response to the GTP PDU monitoring packet.

13. The apparatus of claim 12, wherein:
the information comprises a downlink (DL) delay from the NG-RAN to the UE, and
the performance measurements comprises a DL delay distribution of a plurality of DL delays.

14. The apparatus of claim 12, wherein:
the information comprises 5G Quality of Service (QoS) Identifier (5QI) and Single Network Slice Selection Assistance Information (S-NSSAI) of the GTP PDU monitoring packets, and
the processing circuitry further configures the apparatus to perform measurements per 5QI and per S-NSSAI.

15. The apparatus of claim 12, wherein:
the information comprises an uplink (UL) delay from the NG-RAN to the UE, and
the performance measurements comprises a UL delay distribution of a plurality of UL delays.

16. The apparatus of claim 15, wherein:
the information comprises 5G Quality of Service (QoS) Identifier (5QI) and Single Network Slice Selection Assistance Information (S-NSSAI) of the GTP PDU monitoring packets, and
the processing circuitry further configures the apparatus to perform measurements per 5QI and per S-NSSAI.

17. The apparatus of claim 11, wherein the service producer is implemented in the NG-RAN.

18. The apparatus of claim 11, wherein the service producer is implemented in a management system separate from the NG-RAN.

19. A non-transitory computer-readable storage medium that stores instructions for execution by one or more processors of a next generation radio access network (NG-RAN), the one or more processors to configure the NG-RAN to, when the instructions are executed:
receive, from a user plane function (UPF) of a new radio (NR) network, General Packet Radio Service (GPRS) Tunneling Protocol (GTP) packet measurements unit (PDU) monitoring packets for quality of service (QoS) monitoring;
measure each of a downlink (DL) and an uplink (UL) delay of the GTP PDU monitoring packets between the NG-RAN and a user equipment (UE) connected to the NG-RAN, a delay of the GTP PDU monitoring packet between the NG-RAN and the UE comprising a NG-RAN delay of the NG-RAN and a delay over a Uu interface, the NG-RAN delay including a delay at a $5^{th}$ generation NodeB (gNB) centralized unit user plane (gNB-CU-UP), a delay on an F1-U interface, and a delay on a gNB distributed unit (gNB-DU);
for each of the GTP PDU monitoring packets, increment one of a plurality of bins based on the delay of the GTP PDU monitoring packet between the NG-RAN and the UE, the plurality of bins having different delay ranges;
send, in response to reception of each of the GTP PDU monitoring packets, a GTP PDU monitoring response packet; and
send, to a service producer, performance measurements based on the plurality of bins, adjustment of network resources to improve the performance measurements being dependent on the performance measurements sent to the service producer.

20. The medium of claim 19, wherein the performance measurements includes a distribution of the DL and UL delay per 5G Quality of Service (QoS) Identifier (5QI) and per Single Network Slice Selection Assistance Information (S-NSSAI).

* * * * *